United States Patent

Shimizu

[11] Patent Number: 5,920,320
[45] Date of Patent: Jul. 6, 1999

[54] THREE-DIMENSIONAL SHAPE DATA TRANSFORMING APPARATUS

[75] Inventor: Seiya Shimizu, Kawasaki, Japan

[73] Assignee: Fujitsu Ltd., Kawasaki, Japan

[21] Appl. No.: 08/825,503

[22] Filed: Mar. 31, 1997

[30] Foreign Application Priority Data

Jun. 13, 1996 [JP] Japan ........................ 8-152014

[51] Int. Cl.⁶ ............................................. G06T 15/40
[52] U.S. Cl. ........................................................... 345/422
[58] Field of Search ............................... 345/418, 419,
345/421, 422, 423, 424

[56] References Cited

U.S. PATENT DOCUMENTS

| | | | |
|---|---|---|---|
| 5,497,453 | 3/1996 | Megahed et al. | 345/422 |
| 5,537,520 | 7/1996 | Doi et al. | 345/422 |
| 5,542,025 | 7/1996 | Brown | 345/422 |
| 5,557,711 | 9/1996 | Malzbender | 345/422 |
| 5,561,750 | 10/1996 | Lentz | 345/422 |
| 5,598,515 | 1/1997 | Shashua | 345/422 |
| 5,634,850 | 6/1997 | Kitahara et al. | 345/422 X |
| 5,664,078 | 9/1997 | Yamamoto et al. | 345/422 X |

FOREIGN PATENT DOCUMENTS 2-73471   3/1990   Japan .
4-289976  10/1992  Japan .
4-306782  10/1992  Japan .

*Primary Examiner*—Cliff N. Vo
*Attorney, Agent, or Firm*—Staas & Halsey

[57] ABSTRACT

A three-dimensional shape data transforming apparatus comprising a shape storage unit, an image generation unit, a frame buffer, a Z buffer and vertex determination unit. The image generation unit projects an original shape represented by shape data in the shape storage unit onto a predetermined projection surface (e.g., a cylindrical surface) to create an image. The frame buffer and Z buffer store color information (RGBA values) and depth values (Z values) respectively. The vertex determination unit makes the original shape correspond to an approximate shape (mesh shape) constituted by a plurality of designation points (lattice points) represented by two-dimensional coordinates, and determines the coordinates of the vertexes to which the designation points on the surface of the original shape are made to correspond in accordance with the two-dimensional coordinates of the corresponding designation points and with the corresponding depth values in the Z buffer, whereby the data constituted by the vertexes are regarded as the data on the approximate shape representing the transformed original shape.

9 Claims, 15 Drawing Sheets

FIG. IA
PRIOR ART
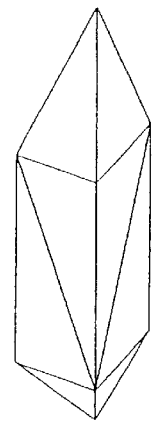
FIG. IB
PRIOR ART
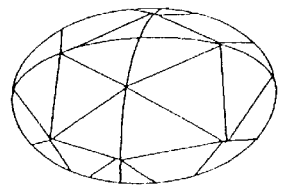
FIG. IC
PRIOR ART
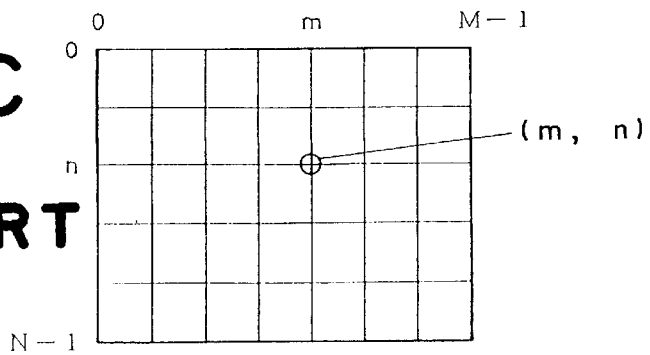

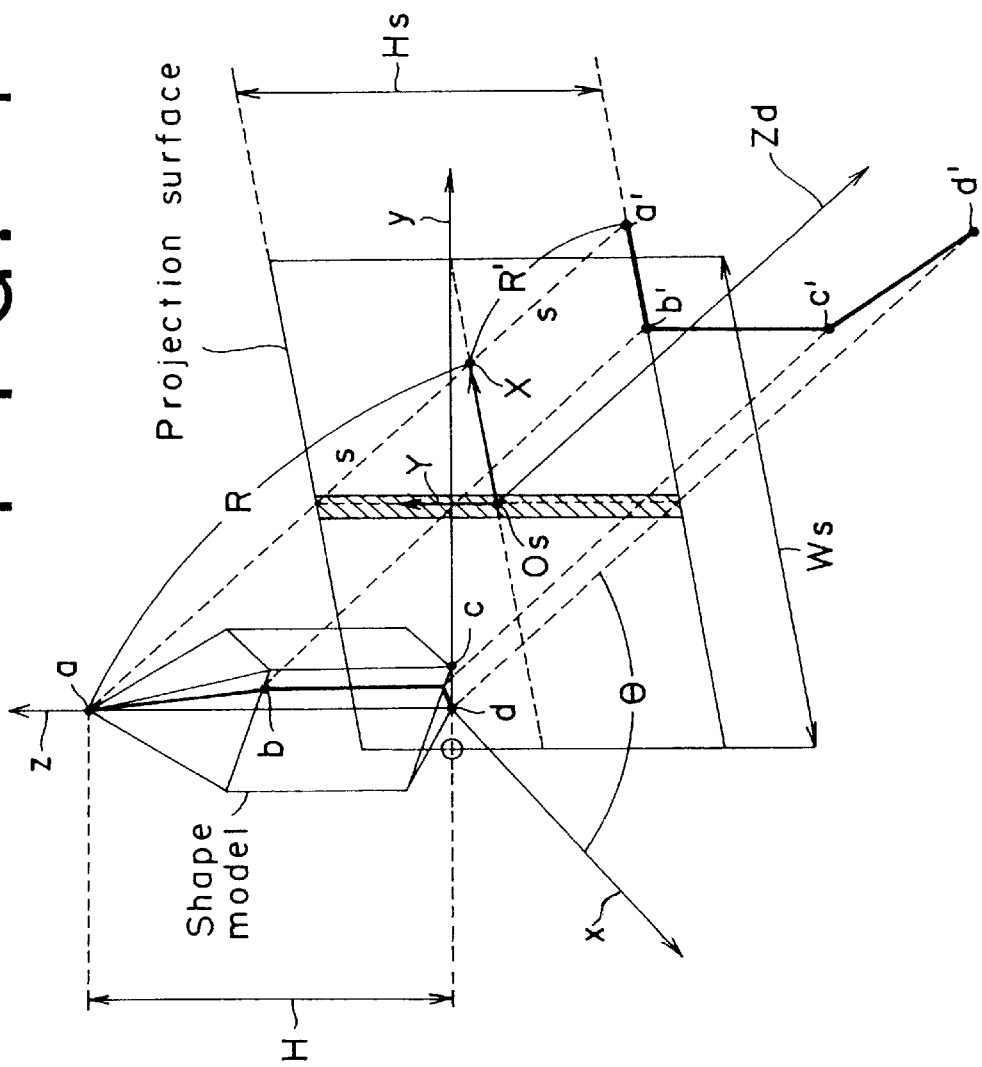

Frame buffer

Z buffer

FIG. 7A

Under conditions of
viewpoint position:
($R \cdot \cos\theta$, $R \cdot \sin\theta$, 240)
view vector:
($-\cos\theta$, $-\sin\theta$, 0)
upward vector: (0,0,1)
generate CG image of
1 × 480 pixels through
parallel projection
onto plane surface

~ST14'

THREE-DIMENSIONAL SHAPE DATA TRANSFORMING APPARATUS

BACKGROUND OF THE INVENTION

1. Field of the Invention

The present invention relates to a technique for transforming two different shape models into an approximate shape sharing the same phase information and having different geometric information.

2. Description of the Prior Art

Three-dimensional (3D) morphing of two different shapes is readily implemented by use of computer graphics (abbreviated to CG hereunder) when models of the two shapes have different geometric information such as vertex positions (coordinates) but share the same phase information such as connective relations of polygons and vertexes. Three-dimensional morphing is a method for generating CG images wherein one 3D shape model transforms smoothly into another. The technique is utilized effectively in creating special effects of images illustratively for use with game machines and in movies.

To prepare shape data for 3D morphing involves primarily one of two methods: building beforehand two shape models in such a way that the shapes will correspond to each other in terms of model information sharing the same number of vertexes and of surfaces (polygons); and projecting given models into intermediate shapes representing two shapes. The latter method involves, more specifically, transforming the two shape models into mesh shapes of M×N vertexes (intermediate shapes) sharing the corresponding mesh vertexes (m, n). Illustrated in FIGS. 1A, 1B, 1C, 2, 3A and 3B are a conventional method for automatically determining which mesh shape vertexes (i.e., lattice points) are to correspond to which positions in the original shapes.

With the above conventional method in use, the original shape model A represented by polygons in FIG. 1A and the original shape model B expressed by polygons in FIG. 1B are projected illustratively onto a cylindrical mesh of FIG. 1C. As shown in FIG. 2, when a shape is represented by cylindrical coordinates (r, θ, z), the coordinates of the point of intersection between the straight line defined by the following expression:

$$\left. \begin{array}{l} \theta = 2\pi \times m/(M-1) \\ z = H \times n(N-1) \end{array} \right] \quad (1)$$

and the shape surface are regarded as the cylindrical coordinates of the mesh vertex (m, n) for the image of the shape projected onto the cylindrical mesh. In the expression (1), H denotes the length of the shape in the z-axis direction. To obtain an r value from the straight line of the expression (1) and from the shape data requires verifying whether each of all shape elements (polygons, etc.) in the shape model intersects the straight line given by the expression (1) above. Transformation from cylindrical coordinates to orthogonal coordinates is accomplished by use of the expression:

$$\begin{bmatrix} x \\ y \\ z \end{bmatrix} = \begin{bmatrix} r \cdot \cos\theta \\ r \cdot \sin\theta \\ z \end{bmatrix} \quad (2)$$

A shape model A' (FIG. 3A) and a shape model B' (FIG. 3B) based on the mesh shapes with all their vertexes obtained as outlined above are similar to the original shape models A and B. As such, the shape models A' and B' are conducive to being processed for 3D morphing wherein the vertex-to-vertex correspondence is easy to achieve.

In the description of the related art above, θ and z settings are assigned equally to each of the vertexes (m, n). In practice, to prepare a mesh shape optimally reflecting the original shape requires several interactive sessions of vertex editing for adjusting the θ and z settings so that the mesh vertexes are positioned to the characteristic parts of the original shape. Every time such adjustment is performed, a check must be made to see whether the straight line of the expression (1) above intersects each of all polygons involved. The process is inefficient in that it necessitates enormous amounts of computations. The same applies even if the intermediate shape may be varied.

SUMMARY OF THE INVENTION

It is therefore an object of the present invention to provide a 3D shape data transforming apparatus capable of reducing the amount of computations in transforming an original shape into an approximate shape and thereby achieving highly efficient processing.

In accordance with an aspect of the present invention, there is provided a three-dimensional shape data transforming apparatus comprising: shape storage means for storing shape data; a frame buffer made of a plurality of pixels for storing color information; a Z buffer for storing depth values (Z values) and corresponding to the pixels of the frame buffer; image generation means for projecting an original shape represented by shape data in the shape storage means onto a predetermined projection surface to prepare an image, the image generation means further storing color information into the frame buffer and depth values into the Z buffer; and vertex determination means for making the original shape correspond to an approximate shape (i.e., shape before transformation) constituted by a plurality of designation points represented by two-dimensional coordinates, the vertex determination means further determining the coordinates of the vertexes to which the designation points are made to correspond in accordance with the two-dimensional coordinates of the corresponding designation points and with the corresponding depth values in the Z buffer. The data constituted by the vertexes whose three-dimensional coordinates are determined by the vertex determination means are used as the data about the approximate shape representing the transformed original shape.

The invention as embodied above makes it possible to obtain, based on the depth values computed by the image generation means upon image generation and stored in the Z buffer, the coordinates of the vertexes constituting the approximate shape (i.e., shape after transformation) made of a plurality of vertexes represented by three-dimensional coordinates. The process eliminates the need for performing computations for intersection judgment as required by conventional apparatuses. Thus in vertex editing involving adjustments for making the designation points (e.g., lattice points) of an approximate shape (e.g., mesh shape) correspond to the characteristic parts of the original shape, the designation points may be varied interactively on the spot without having to carry out complicated calculations. The result is a significant improvement in interactive responsiveness of the 3D shape data transforming apparatus.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1A is a view for explaining the prior art, showing a shape model yet to be transformed;

FIG. 1B is another view for explaining the prior art, depicting another shape model yet to be transformed;

FIG. 1C is another view for explaining the prior art, illustrating a three-dimensional mesh shape;

FIG. 4 is a view for explaining a first embodiment of the invention, showing a typical process of generating a CG image on a cylindrical surface used as a projection surface;

FIG. 7A is a flowchart showing part of the image generation process carried out by the second embodiment;

DESCRIPTION OF THE PREFERRED EMBODIMENTS

First Embodiment

The first embodiment of the invention is based on a CG system adopting the so-called Z buffer scheme wherein depth values (Z values) stored in a Z buffer are used to transform a 3D shape into data representing another shape such as a mesh shape. The Z buffer scheme is a common technique of computer graphics. The CG system has the Z buffer for storing the depth values (Z values) of the points (i.e., pixels) constituting a CG image to be generated, and a frame buffer for storing RGBA values (red, green, blue, transparency) as color information about the image. When a new pixel having RGBA values and a Z value is to be written to the frame buffer, the Z value corresponding to the pixel location is read from the Z buffer. The applicable RGBA values and Z value are written to their respective buffers only if the retrieved Z value is found to be smaller than the already written Z values. This means that each new point written to the frame and Z buffers has the smallest depth so far, i.e., is located on the surface of the object (shape) in view. The process allows a CG image to be drawn (generated) appropriately without recourse to complex processing for determining the hiding relations of the polygons involved.

Figure 2:
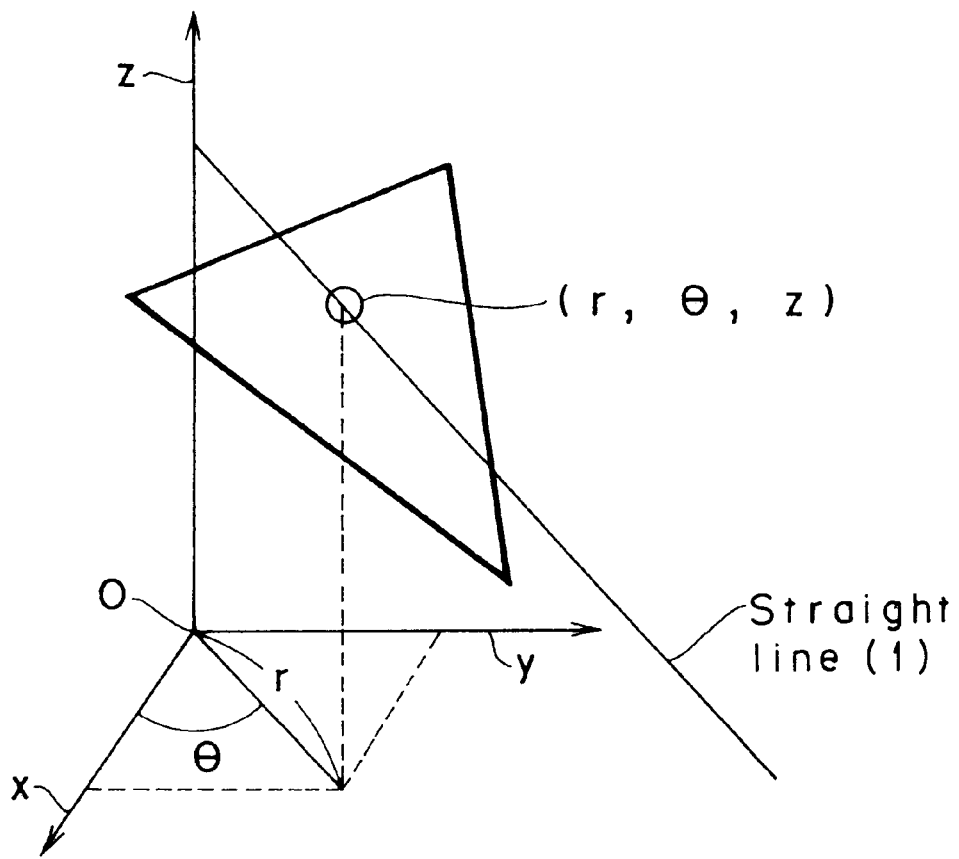
FIG. 2 is a view for explaining a conventional process of computing the point of intersection between a straight line and a shape (polygon) in cylindrical coordinates.
Figure 3A:
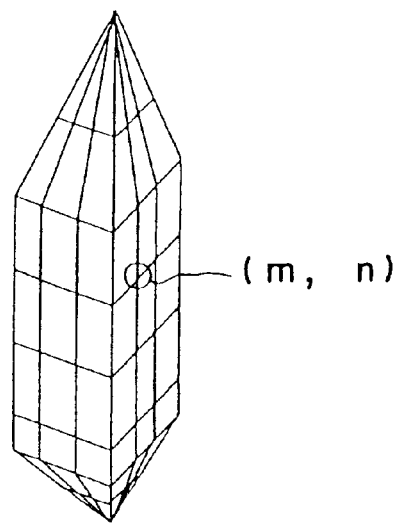
FIG. 3A is another view for explaining the prior art, showing a shape model that has been transformed.
Figure 3B:
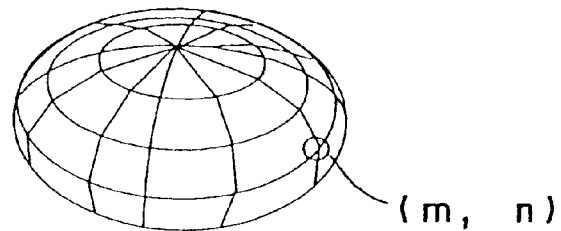
FIG. 3B is another view for explaining the prior art, illustrating another shape model that has been transformed.

The first embodiment takes notice of the fact that the Z values in the Z buffer following the drawing of the shape model represent the r value in the cylindrical coordinates (r, θ, z) of the surface of the shape model shown in FIG. 2. First a CG image (Z value image, RGBA image) is created such that its Z values in the Z buffer are effective in calculating the r value in the cylindrical coordinates. This process will be described in more detail with reference to FIG. 4. Under the conditions of $$\left. \begin{array}{l} \text{viewpoint position: } (R \cdot \cos\theta,\ R \cdot \sin\theta,\ H/2) \\ \text{view vector: } (-\cos\theta,\ -\sin\theta,\ 0) \\ \text{upward vector: } (0,\ 0,\ 1) \end{array} \right] \quad (3)$$

a slit-like shape model (i.e., shape expressed by shape data) is drawn through parallel projection onto a cylindrical surface used as a projection surface, the model having a width of one pixel in the Xs direction. As a result, the Z values of thick lines a, b, c and d in FIG. 4 are placed into the Z buffer and their RGBA values into the frame buffer. In the expression (3) above, H denotes the height of the shape model in the slit direction.

Figure 5A:
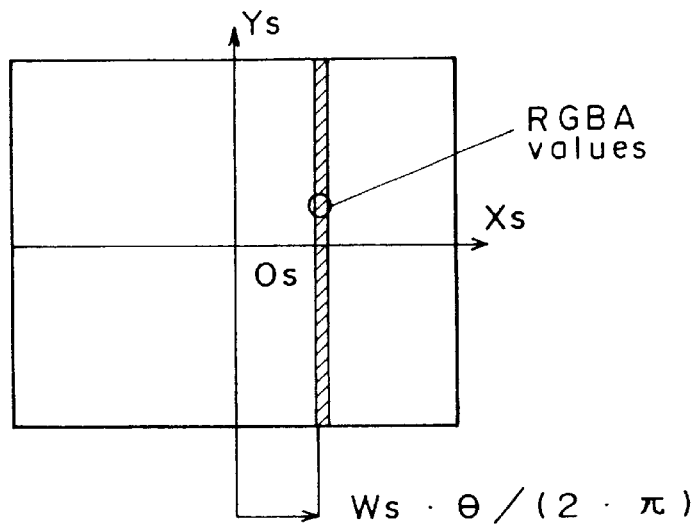
FIG. 5A is a view indicating where RGBA values are located when stored in a frame buffer of the first embodiment.
Figure 5B:
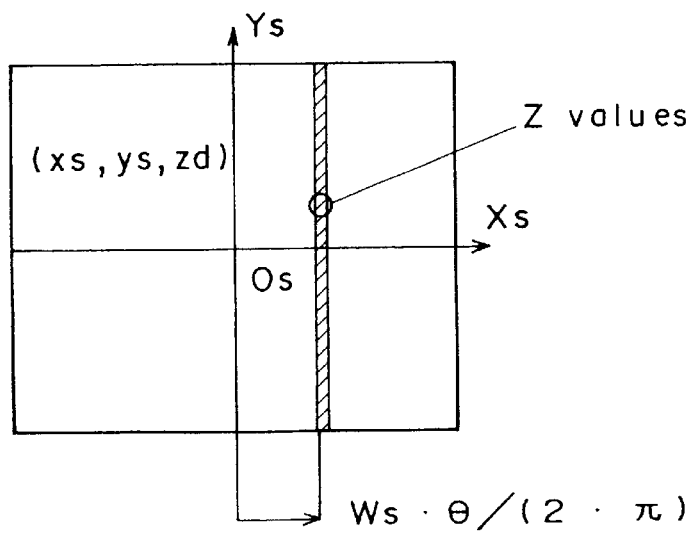
FIG. 5B is a view denoting illustrating where Z values are located when stored in a Z buffer of the first embodiment.

FIG. 5A shows where the slit-like CG image thus generated is held in the frame buffer, and FIG. 5B indicates the stored position of the CG image in the Z buffer. With the value of θ varied successively, a plurality of CG images are stored into their corresponding locations in the frame and Z buffers. The stored locations in an Os-Xs-Ys coordinate system in the frame and Z buffers are given by the expression $$Xs = Ws \cdot \theta/(2 \cdot \pi) \quad (4)$$

If the value Xs is not an integral number, it is rounded to the nearest integer. For example, if the frame and Z buffers have 640×480 pixels each, the Z values and RGBA values on the surface of the shape model are stored into the buffers with the resolution of θ at 0.0098 radian (0.56 degrees).

When the point a on the z-axis takes the value of R' in the Z buffer, the cylindrical coordinates of a given point (xs, ys, zd) in that buffer are given as $$\begin{bmatrix} r \\ \theta \\ z \end{bmatrix} = \begin{bmatrix} zd \cdot R/R' \\ 2 \cdot \pi \cdot xs/Ws \\ H \cdot (ys/Hs + 0.5) \end{bmatrix} \quad (5)$$

To transform the original shape into an M×N mesh shape involves first drawing an M×N mesh in the buffer, transforming the coordinates (xs, ys, zd) of the vertex position of the original shape into orthogonal coordinates by use of the expressions (2) and (5) above, and regarding that point as the vertex position of the mesh shape. Where the mesh vertex position is to be varied interactively, the vertex position is designated in two-dimensional coordinates (xs, ys) in the frame buffer or Z buffer. The vertex position in orthogonal coordinates is obtained by simply calculating the expressions (2) and (5) again; there is no need to manipulate the original shape data.

Figure 6:
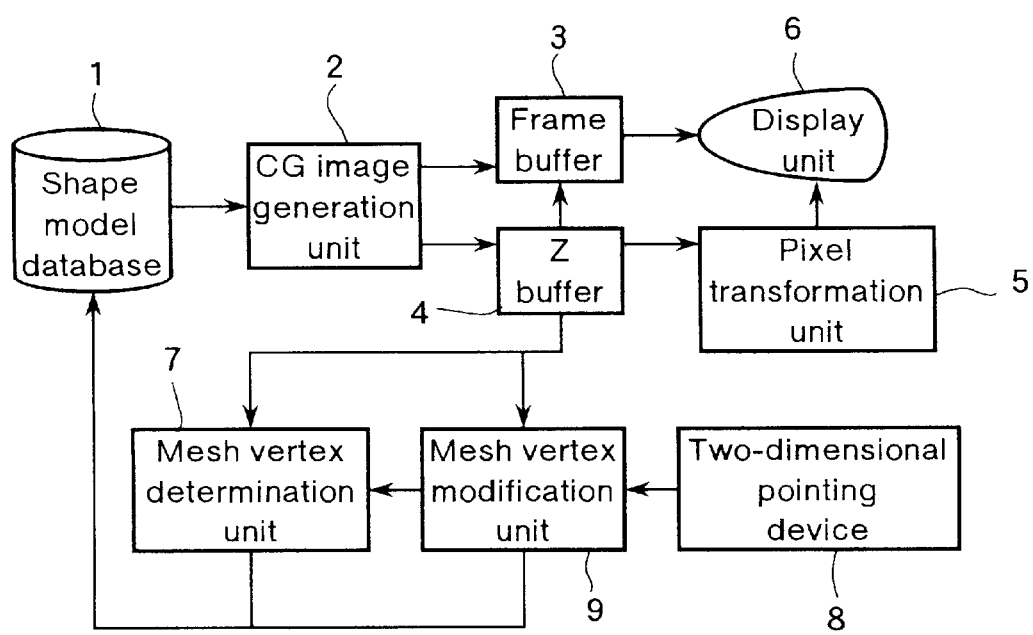
FIG. 6 is a block diagram outlining a specific constitution of the first embodiment.

A specific constitution of the first embodiment will now be described. FIG. 6 illustrates a typical constitution of a shape model meshing apparatus (i.e., 3D shape data transforming apparatus) practiced as the first embodiment of the invention. The meshing apparatus is designed to transform a given shape model into the designated mesh shape of M×N pixels. The meshing apparatus comprises a shape model database (shape storage means) 1, a CG image generation unit (image generation means) 2, a frame buffer 3, a Z buffer 4, a pixel transformation unit 5, a display unit 6, a mesh vertex determination unit (vertex determination means) 7, a two-dimensional pointing device 8 and a mesh vertex modification unit 9.

The shape model database 1 stores shape models described by shape data such as 3D polygon data. In operation, the shape model database 1 transmits to the CG image generation unit 2 the data about the original shape to be meshed. The CG image generation unit 2 varies the value θ within the range of $-\pi < \theta \leq \pi$ with the resolution of $(2\pi/640)$ radian, thereby generating a CG image of 1×480 pixels through parallel projection regarding each θ value varied. The CG image generation unit 2 then transmits the RGBA and Z values of each of the pixels involved to the frame buffer 3 and Z buffer 4. Each CG image of 1×480 pixels is stored in each of the buffers 3 and 4 in a 1×480 pixel region defined by the expression $$Xs = 320/\pi \cdot \theta \qquad (6)$$

That is, the CG image generation unit 2 creates 640 CG images with their θ values differing from one another. The frame buffer 3 is a two-dimensional memory of 640×480 pixels for storing RGBA values. At each of its addresses, the frame buffer 3 holds 24-bit information (i.e., 8 bits assigned to each of RGBA values). Whether the RGBA values of the position (xs, ys) sent from the CG image generation unit 2 may be written to the position (xs, ys) in the frame buffer 3 depends on the Z value of the position (xs, ys) in the Z buffer 4.

The Z buffer 4 is a two-dimensional memory of 640×480 pixels for storing Z values. At each of its addresses, the Z buffer 4 holds an integer 24-bit Z value. The frame buffer 3 and Z buffer 4 accommodate RGBA values and Z values respectively as per the Z buffer scheme. Specifically, the Z value of the position (xs, ys) sent from the CG image generation unit 2 is compared with the already stored Z values. If the transmitted value is smaller than the existing values, that value is written to the Z buffer 4. At the same time, the concomitant RGBA values are written to the same position in the frame buffer 3. An RGBA image of 640×480 pixels held in the frame buffer 3 is displayed on the display unit 6. The Z values of 640×480 pixels stored in the Z buffer 4 are transformed by the pixel transformation unit 5 into a variable-density image wherein brightness values are varied depending on the magnitude of each Z value. The variable-density image is displayed on the display unit 6. Illustratively, if Zn represents the Z value and G denotes the variable-density pixel value after transformation, the resulting eight-bit pixel value has its brightness made higher the smaller the Z value in the expression $$G = 255 - Zn/2^{16} \qquad (7)$$

The mesh vertex determination unit 7 determines the coordinates of the mesh shape vertex on the basis of the values prepared in the Z buffer 4. Where the vertex position is to be automatically determined, the vertex (m, n) position of the M×N mesh shape in each buffer is defined by the expression $$\begin{bmatrix} xs \\ yx \end{bmatrix} = \begin{bmatrix} 640m/(M-1) - 320 \\ 480n/(N-1) - 240 \end{bmatrix} \qquad (8)$$

If the Z value of the position thus defined is represented by zd, the vertex position of the mesh shape may be calculated by use of the expressions (2) and (5) (Ws=640, Hs=480). After all vertex positions of the mesh shape have been calculated, the mesh information (i.e., mesh shape data) is stored into the shape model database 1.

When an operator designates vertex positions interactively, the two-dimensional pointing device 8 such as a mouse is used to specify the two-dimensional coordinates (xs, ys) of the image by referring to the RGBA image or Z-value variable-density image drawn on the display unit 6. The designated results are sent to the mesh vertex modification unit 9. In turn, the mesh vertex modification unit 9 determines the mesh vertex (m, n) corresponding to the coordinates (xs, ys) in accordance with the interactive instructions coming from the operator. The two-dimensional coordinates of the vertexes not designated by the operator are linearly interpolated on the basis of the two-dimensional coordinates of the designated vertexes. The two-dimensional coordinates of the mesh vertexes (=coordinates in the buffer) are transferred to the mesh vertex determination unit 7. Upon receipt of the two-dimensional coordinates, the mesh vertex determination unit 7 calculates accordingly the vertex positions of the mesh shape in the orthogonal coordinates.

The RGBA image in the frame buffer 3 is stored into the shape model database 1 as a texture image of the mesh shape prepared above. The coordinates (s, t) of the mesh vertex calculated from the coordinates (xs, ys) in the frame buffer 3 are given by the expression $$\begin{bmatrix} s \\ t \end{bmatrix} = \begin{bmatrix} (xs + 320)/640 \\ (ys + 240)/480 \end{bmatrix} \qquad (9)$$

When the RGBA image in the frame buffer 3 is used as the texture for the shape to be generated, the texture coordinates of each vertex are easily acquired because the coordinates in the frame buffer 3 correspond to those in the Z buffer 4.

Figure 6A:
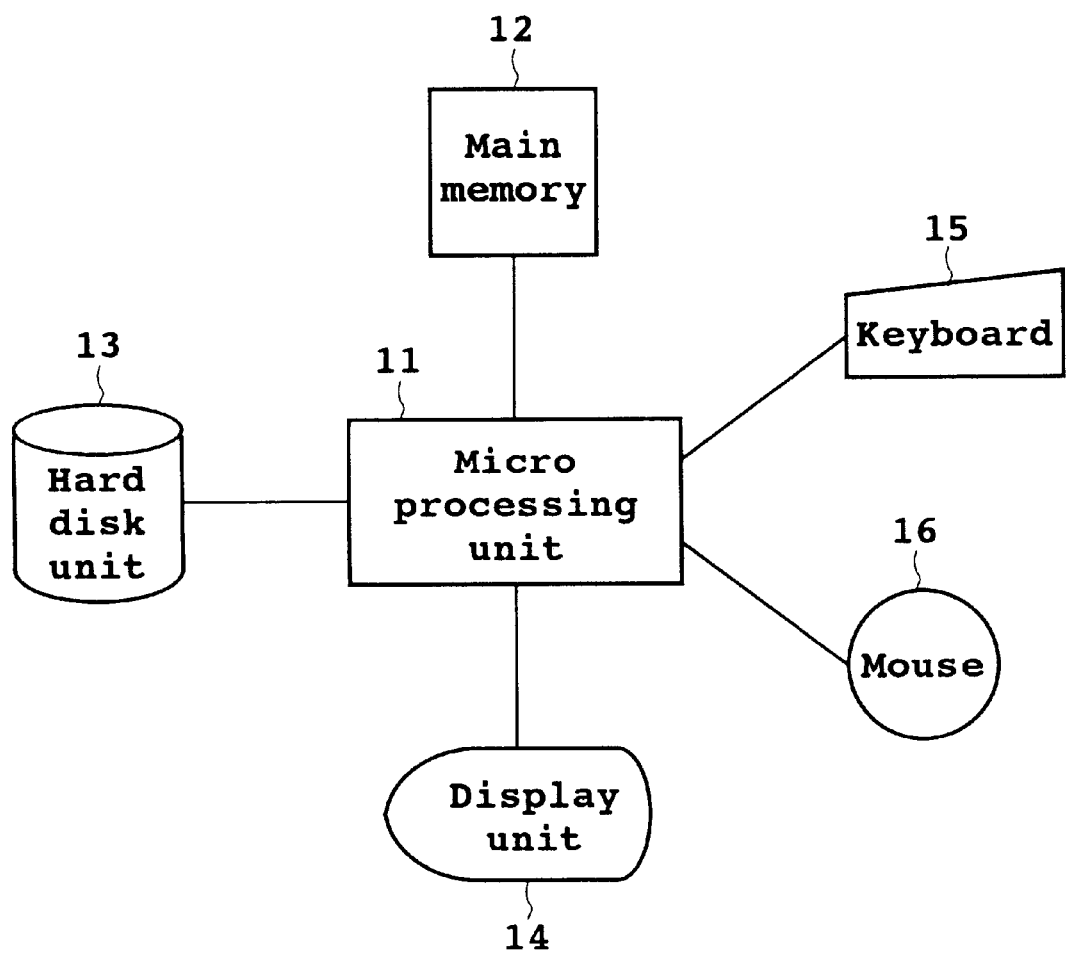
FIG. 6A is a block diagram showing a hardware constitution of a computer system implementing the first embodiment.

The shape model meshing apparatus may be implemented illustratively by a computer system having a microprocessor. FIG. 6A is a block diagram showing a hardware constitution of a computer system implementing the meshing apparatus. In FIG. 6A, reference numeral 11 is a microprocessing unit (MPU), 12 is a main memory (MM), 13 is a hard disk unit (HD), 14 is a display unit, 15 is a keyboard, and 16 is a mouse used as a two-dimensional pointing device. The hard disk unit 13 stores the above-mentioned shape data as well as various program and other data executed by the microprocessing unit 11. Any one of appropriate programs retained in the hard disk unit 13 is run by the microprocessing unit 11 to implement any one of the corresponding functions including those of the CG image generation unit 2, pixel transformation unit 5, mesh vertex determination unit 7 and mesh vertex modification unit 9 shown in FIG. 6. A memory area needed to constitute the frame buffer 3 and Z buffer 4 in FIG. 6 is suitably allocated in the main memory 12 (or hard disk unit 13).

Figure 6B:
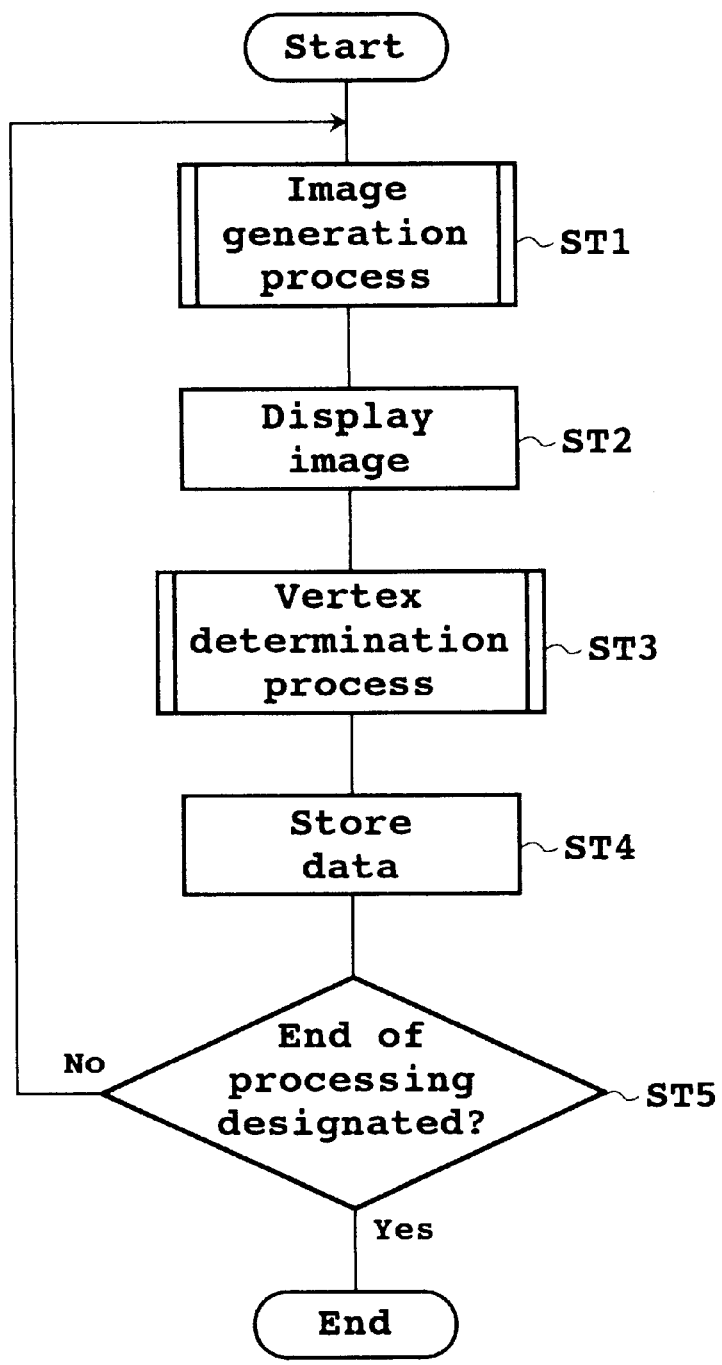
FIG. 6B is a flowchart of steps constituting main processing performed by the first embodiment.

FIGS. 6B through 6E are flowcharts of steps performed by the microprocessing unit of the meshing device. FIG. 6B is flowchart of main processing performed by the microprocessing unit of the first embodiment. In FIG. 6B, the start of the processing is followed by an image generation process in step ST1. In step ST2, an image display process is carried out. In step ST3, a vertex determination process is executed, followed by a data storage process in step ST4. Finally, a check is made in step ST5 to see if the operator has designated the end of the processing. If the operator has yet to designate the end of the processing, step ST1 is reached again. If the end of the processing is found to be designated, the main processing is terminated.

Figure 6C:
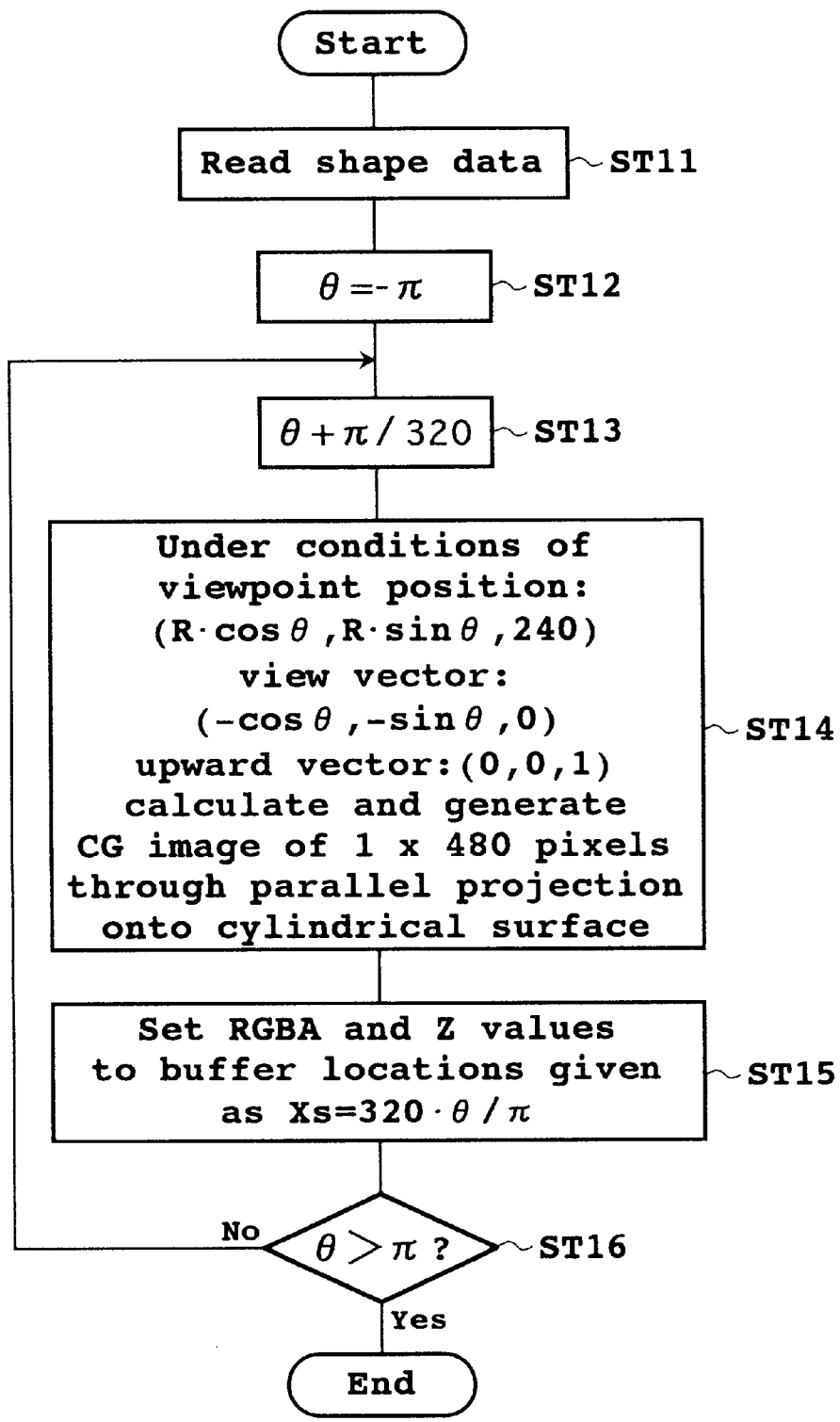
FIG. 6C is a flowchart of steps constituting an image generation process carried out by the first embodiment.

The image generation process of step ST1 in FIG. 6B is depicted in more detail in FIG. 6C. In step ST11 of FIG. 6C, shape data is read from the hard disk unit 13 into the main memory 12. In step ST12, an initial value of $-\pi$ is substituted for $\theta$. In step ST13, a value of $\pi/320$ is added to the value $\theta$. In step ST14, under the conditions of the expression (3), a CG image of 1×480 pixels is calculated and generated through parallel projection onto a cylindrical surface used as a projection surface. In step ST15, the RGBA and Z values thus calculated and generated are placed into those locations in the main memory 12 which are allocated as the frame buffer and Z buffer and which are defined by the expression (4). In step ST16, a check is made to see if the value $\theta$ is greater than $\pi$. If the result of the check is negative ("NO" in step ST16), step ST13 is reached again. If the value $\theta$ is found to be greater than $\pi$, the image generation process is terminated. The microprocessing unit then proceeds to step ST2 in FIG. 6B. In step ST2, the appropriate pixel transformation process is carried out by use of the RGBA values stored in the frame buffer and the Z value held in the Z buffer. The resulting CG image is displayed on the display unit 14.

Figure 6D:
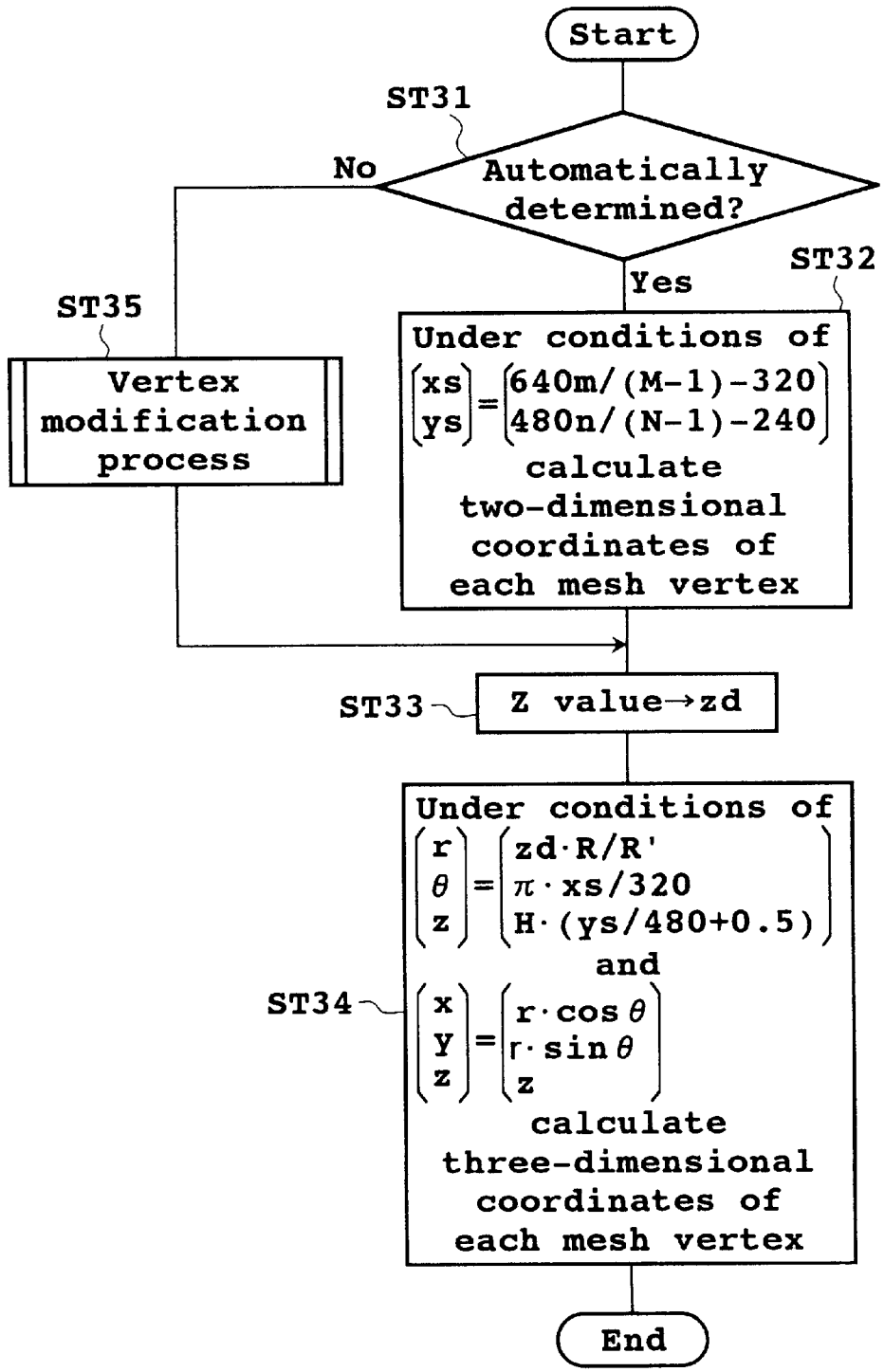
FIG. 6D is a flowchart of steps constituting a vertex determination process executed by the first embodiment.

The vertex determination process of step ST3 in FIG. 6B is described in more detail in FIG. 6D. In step S31 of FIG. 6D, a check is made to see if the vertex positions of the mesh shape are to be determined automatically. If the positions are to be determined automatically, step ST32 is reached in which the two-dimensional coordinates (xs, ys) of each mesh vertex are calculated by use of the expression (8). In step ST33, the Z value representing the Z position corresponding to the calculated two-dimensional values (xs, ys) is set as zd to the Z buffer. In step ST34, the expressions (5) and (2) are used to calculate the three-dimensional coordinates (x, y, z) of each mesh vertex. This completes the vertex determination process. If the vertex positions are not found to be determined automatically in step ST31, step ST35 is reached. In step ST35, a vertex modification process is carried out. Step ST35 is followed by step ST33.

Figure 6E:
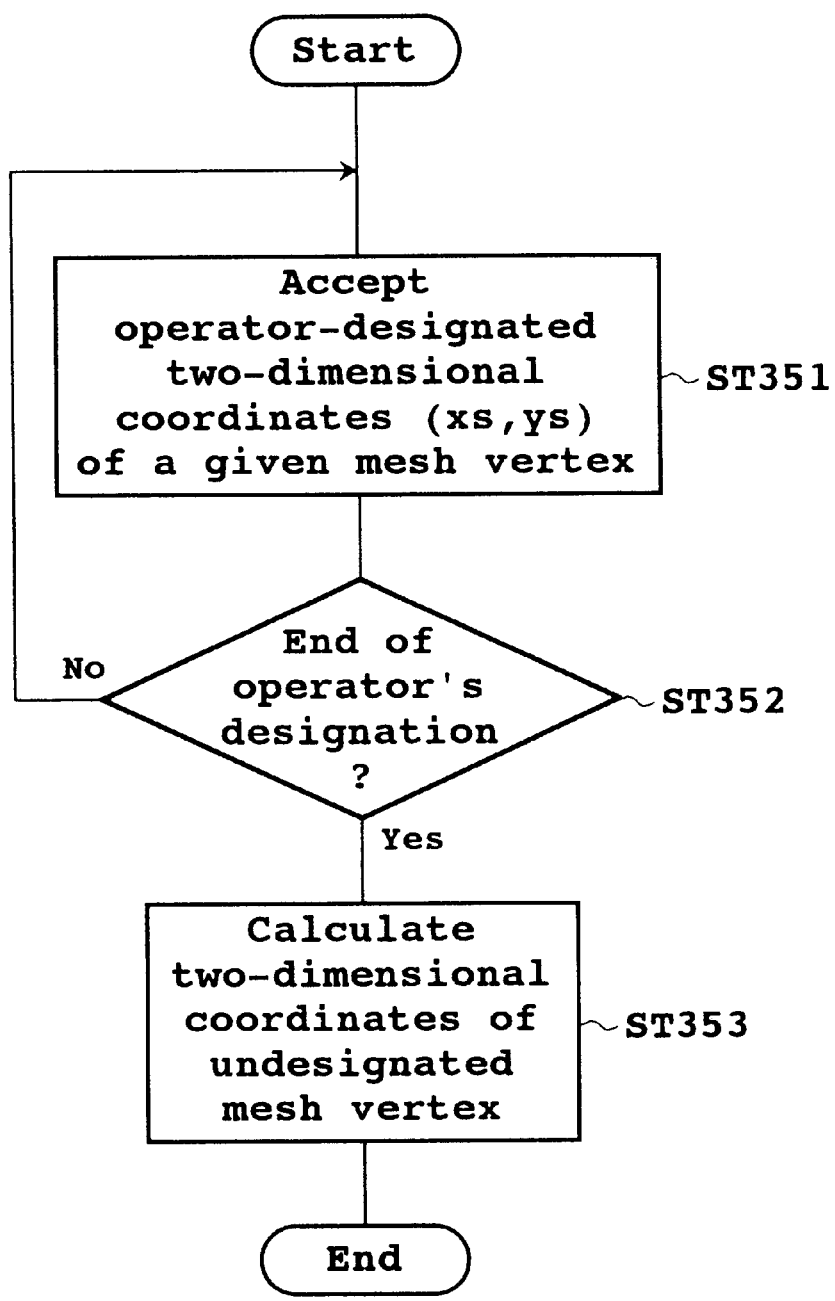
FIG. 6E is a flowchart of steps constituting a vertex modification process performed by the first embodiment.

The vertex modification process of step ST35 in FIG. 6D is shown in more detail in FIG. 6E. In step ST351 of FIG. 6E, the operator uses the keyboard 15 or mouse 16 to designate interactively the two-dimensional coordinates (xs, ys) of a given mesh vertex, and the designated coordinates are accepted by the microprocessing unit. In step ST352, a check is made to see if the operator has ordered the end of the coordinate designation. If the operator has yet to end the designation, step ST351 is reached again and the next designation of coordinates is awaited. If the operator's designation is found to have ended in step ST352, step ST353 is reached. In step ST353, the two-dimensional coordinates of any undesignated mesh vertex are calculated through linear interpolation on the basis of the two-dimensional coordinates of the designated vertexes. This terminates the vertex modification process. The microprocessing unit then proceeds to step ST4 of FIG. 6B. In step ST4, the three-dimensional coordinates (x, y, z) of the mesh vertexes calculated in step ST34 of FIG. 6D are stored as shape data into the hard disk unit 13 after undergoing appropriate coordinate transformation where necessary. In step ST5, as mentioned, a check is made to see if the operator has designated the end of the processing.

Steps ST11 through ST16 in FIG. 6C correspond to the processing performed by the CG image generation unit 2 shown in FIG. 6, and step ST2 in FIG. 6B corresponds to the processing by the pixel transformation unit 5. Steps ST31 through ST34 in FIG. 6D and step ST4 in FIG. 6B represent the processing by the mesh vertex determination unit 7 in FIG. 6, and steps ST351 through ST353 in FIG. 6E denote the processing by the mesh vertex modification unit 9 in FIG. 6.

Second Embodiment

Figure 7:
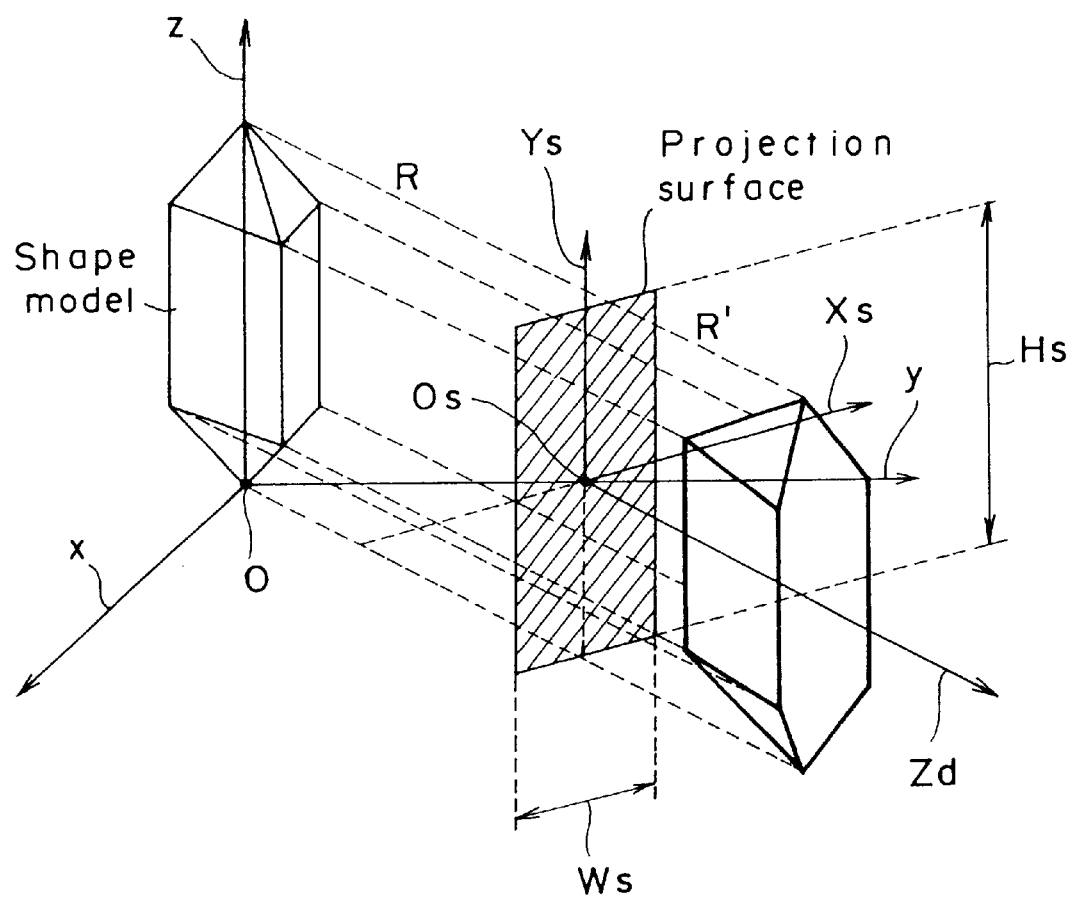
FIG. 7 is a view for explaining a second embodiment of the invention, showing a typical process of generating a CG image on a plane used as a projection surface.

Whereas the first embodiment has been shown projecting onto a cylindrical surface the original shape represented by the original shape data, the second embodiment involves projecting the original shape onto a plane, as illustrated in FIG. 7. The projection plane is selected so that the shape model fits exactly thereto through parallel projection. Since the Os-Xs-Ys-Zd coordinates are linearly related to the global coordinate system, it is easy to calculate the coordinates of any point on the surface of the original shape from the values in the Z buffer. The system configuration of the second embodiment is the same as that shown in FIGS. 6 and 6A.

The processing by the microprocessing unit implementing the second embodiment is the same as that described with reference to the flowcharts of FIGS. 6B through 6E with the exception of step ST14 in FIG. 6C. Step ST14 in FIG. 6C for the first embodiment is replaced by step ST14' in FIG. 7A for the second embodiment. In step ST14', under the conditions of the expression (3), a CG image of 1×480 pixels is calculated and generated through parallel projection onto a plane surface used as a projection surface.

Third Embodiment

Figure 8:
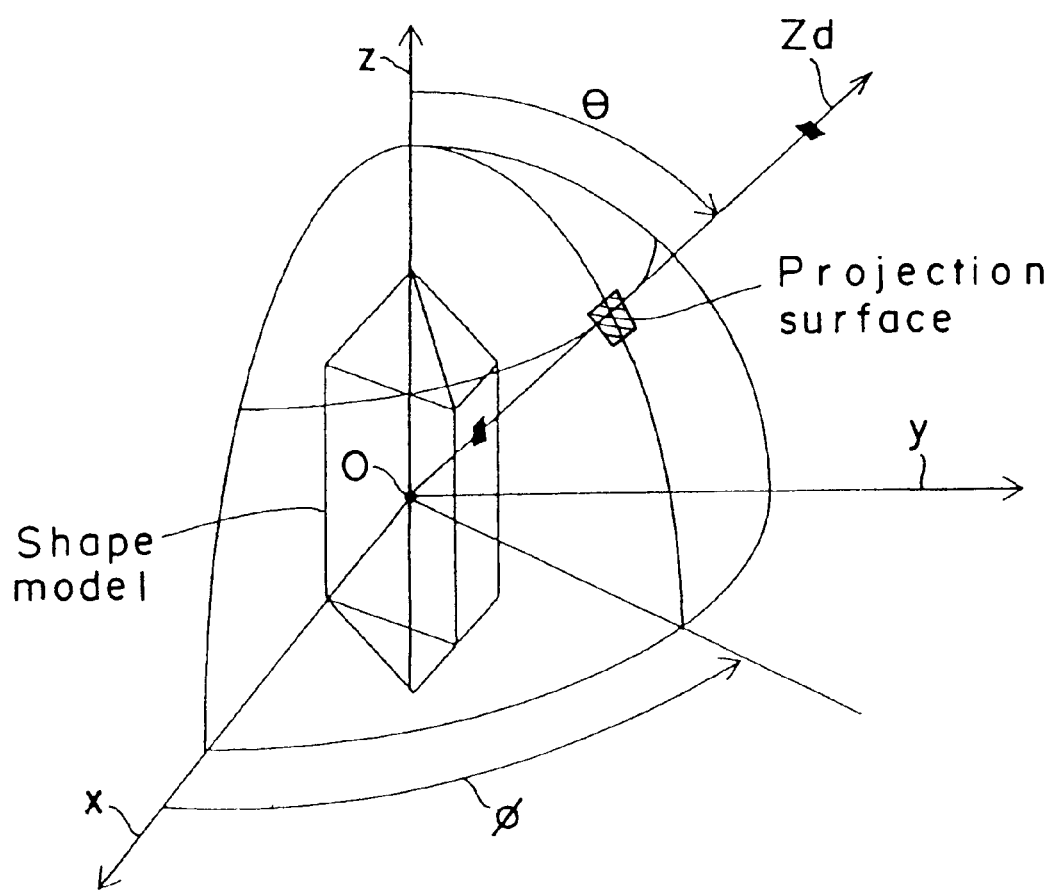
FIG. 8 is a view for explaining a third embodiment of the invention, depicting a typical process of generating a CG image on a sphere used as a projection surface.

Whereas the first embodiment has been shown projecting onto the cylindrical surface the original shape represented by the original shape data, the third embodiment involves projecting the original shape onto a sphere, as depicted in FIG. 8. In this case, the CG image prepared at any one time is of a 1×1 pixel size. The image is drawn through parallel projection onto the sphere under the conditions of $$\left. \begin{array}{l} \text{viewpoint position: } (R \cdot \cos\phi, \ R \cdot \sin\phi, \ R \cdot \cos\theta) \\ \text{view vector: } (-\cos\phi, \ -\sin\phi, \ -\cos\theta) \end{array} \right] \quad (10)$$

with the values $\theta$ and $\phi$ of polar coordinates (r, $\theta$, $\phi$) varied within the ranges of $$-\pi < \theta \leq \pi, \ -\pi/2 < \phi \leq \pi/2$$

The image thus obtained is stored in the position (xs, ys) in the Z buffer and frame buffer. The location to store the 1×1 pixel image of the position ($\theta$, $\phi$) is defined by the expression $$\begin{bmatrix} xs \\ ys \end{bmatrix} = \begin{bmatrix} \phi/(2\pi) \cdot Ws \\ \theta/\pi \cdot Hs \end{bmatrix} \quad (11)$$

The system configuration of the third embodiment above is the same as that in FIGS. 6 and 6A.

Figure 8A:
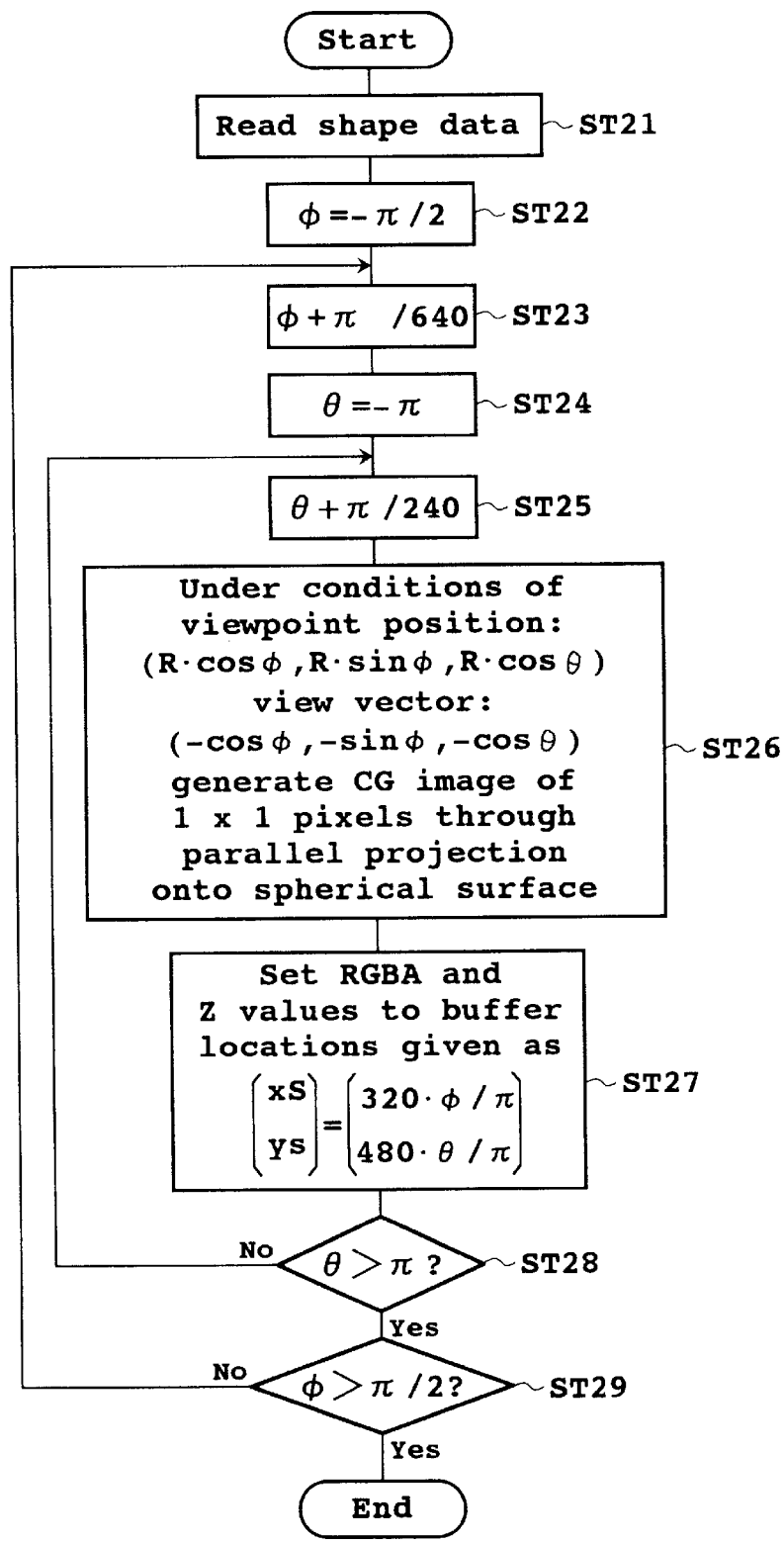
FIG. 8A is a flowchart of steps constituting an image generation process executed by the third embodiment.

The processing by the microprocessing unit implementing the third embodiment is the same as that described with reference to the flowcharts of FIGS. 6B through 6E with the exception of steps ST11 through ST16 in FIG. 6C. Steps ST11 through ST16 in FIG. 6C for the first embodiment are replaced by steps ST21 through ST29 in FIG. 8A for the third embodiment. In step ST21, shape data is read from the hard disk unit 13 into the main memory 12. In step ST22, an initial value of $-\pi/2$ is substituted for $\phi$. In step ST23, a value of $\pi/640$ is added to the value $\phi$. In step ST24, the value $-\pi$ is substituted for $\theta$. In step ST25, a value of $\pi/240$ is added to the value $\theta$. In step ST26, under the conditions of the expression (10), a CG image of 1×1 pixels is calculated and generated through parallel projection onto a spherical surface used as a projection surface. In step ST27, the RGBA and Z values thus calculated and generated are placed into those locations (xs, ys) in the main memory 12 which are allocated as the frame buffer and Z buffer and which are defined by the expression (11). In step ST28, a check is made to see if the value $\theta$ is greater than $\pi$. If the result of the check is negative ("NO" in step ST28), step ST25 is reached again. If the value $\theta$ is found to be greater than $\pi$, step ST29 is reached. In step ST29, a check is made to see if the value $\phi$ is greater than the value $\pi/2$. If the value $\phi$ is no greater than a value of $\pi/2$ ("NO" in step ST29), step ST23 is reached again. If the value $\phi$ is found to be greater than the value $\pi/2$, this image generation process is terminated.

As described and according to the invention, the geometric data on the original shape surface is developed in advance in the Z buffer. This minimizes the amount of repeated calculations during subsequent interactive vertex editing to obtain the vertex positions of an approximate shape that has been transformed. The benefits of the invention include an improvement in the responsiveness of the interactive processing and better operability of the apparatus. Because the vertex editing process is carried out regarding the two-dimensional image in the Z buffer or frame buffer, the operator can grasp the characteristics of the shape in question more easily than before.

While preferred embodiments of the invention have been described using specific terms, such description is for illustrative purposes only, and it is to be understood that changes and variations may be made without departing from the spirit or scope of the following claims.

What is claimed is:

1. A three-dimensional shape data transforming apparatus comprising:

shape storage means for storing shape data;

a frame buffer made of a plurality of pixels for storing color information;

a Z buffer for storing depth values and corresponding to the pixels of said frame buffer;

image generation means for projecting an original shape represented by shape data in said shape storage means onto a predetermined projection surface to prepare an image, said image generation means further storing color information into said frame buffer and depth values into said Z buffer;

and vertex determination means for making said original shape correspond to an approximate shape constituted by a plurality of designation points represented by two-dimensional coordinates, said vertex determination means determining three-dimensional coordinates of vertexes on the surface of said original shape to which said designation points are made to correspond in accordance with the two-dimensional coordinates of the corresponding designation points and with the corresponding depth values in said Z buffer.

2. A three-dimensional shape data transforming apparatus according to claim 1, wherein said approximate shape is a mesh shape and wherein the designation points of said approximate shape are the lattice points of said mesh shape.

3. A three-dimensional shape data transforming apparatus according to claim 2, wherein the correspondence between part of the lattice points of said mesh shape and the characteristic points of said original shape is input interactively.

4. A three-dimensional shape data transforming apparatus according to claim 3, wherein the lattice points of said mesh shape other than those corresponding to the characteristic points of said original shape are interpolated on the basis of the corresponding lattice points.

5. A three-dimensional shape data transforming apparatus according to claim 1, wherein said predetermined projection surface used by said image generation means is a cylindrical surface.

6. A three-dimensional shape data transforming apparatus according to claim 5, wherein said image generation means projects the line of intersection between a plane surface including the center axis of said cylindrical surface and said original shape onto said cylindrical surface and rotates said plane surface including said center axis around said center axis successively to create a slit-like image.

7. A three-dimensional shape data transforming apparatus according to claim 1, wherein said predetermined projection surface is a plane.

8. A three-dimensional shape data transforming apparatus according to claim 1, wherein said predetermined projection surface is a sphere.

9. A three-dimensional shape data transforming apparatus according to claim 8, wherein said image generation means projects the point of intersection between a straight line passing the center of said sphere and said original shape onto said sphere and rotates said straight line passing the center of said sphere around said center horizontally and vertically in successive fashion to create a point-like image.

* * * * *